(12) United States Patent
Nakazawa et al.

(10) Patent No.: US 8,812,731 B2
(45) Date of Patent: Aug. 19, 2014

(54) SERVICE PROVIDING SYSTEM ALLOWING FLEXIBLE COOPERATION BETWEEN APPLICATIONS EXPLOITING DIFFERENT PROTOCOLS

(75) Inventors: Osamu Nakazawa, Chiba (JP); Haruo Fukuda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 931 days.

(21) Appl. No.: 10/921,343

(22) Filed: Aug. 19, 2004

(65) Prior Publication Data

US 2005/0044188 A1 Feb. 24, 2005

(30) Foreign Application Priority Data

Aug. 20, 2003 (JP) ................................. 2003-296242

(51) Int. Cl.
*G06F 15/16* (2006.01)
*H04L 29/06* (2006.01)
*H04L 29/08* (2006.01)

(52) U.S. Cl.
CPC .............. *H04L 29/06* (2013.01); *H04L 65/104* (2013.01); *H04L 67/02* (2013.01); *H04L 65/103* (2013.01); *H04L 69/08* (2013.01); *H04L 65/1006* (2013.01); *H04L 65/1096* (2013.01); *H04L 29/06027* (2013.01)
USPC ........................................................ 709/246

(58) Field of Classification Search
USPC ......................................... 709/226, 230, 246
See application file for complete search history.

(56) References Cited

U.S. PATENT DOCUMENTS

| | | | |
|---|---|---|---|
| 6,785,730 B1 | 8/2004 | Taylor | |
| 2002/0101879 A1* | 8/2002 | Bouret et al. | 370/465 |
| 2002/0147818 A1* | 10/2002 | Wengrovitz | 709/228 |
| 2003/0069922 A1* | 4/2003 | Arunachalam | 709/203 |
| 2003/0079020 A1* | 4/2003 | Gourraud et al. | 709/227 |
| 2003/0125021 A1* | 7/2003 | Tell et al. | 455/426 |
| 2003/0126196 A1* | 7/2003 | Lagimonier et al. | 709/203 |
| 2003/0137991 A1* | 7/2003 | Doshi et al. | 370/466 |
| 2004/0199828 A1 | 10/2004 | Cabezas et al. | |

FOREIGN PATENT DOCUMENTS

JP 2004-247916 A 9/2004

OTHER PUBLICATIONS

Internet Engineering Task Force (IETF) Network Working Group; "SIP: Session Initiation Protocol", Jun. 2002, pp. 1-269.
"Hypertext Transfer Protocol/1.1-HTTP/1.1", Internet Engineering Task Force (IETF) Network Working Group; Jan. 1997, pp. 1-162.
Y. Chimura et al.; "Session Initiation Protocol Textbook (SIP Textbook)" first edition; May 2, 2003; pp. 50-59.

(Continued)

*Primary Examiner* — Ryan Jakovac
(74) *Attorney, Agent, or Firm* — Rabin & Berdo, P.C.

(57) ABSTRACT

In a service providing system, the problem of extensibility of applications may be overcome, and flexible cooperation is rendered possible between applications exploiting different protocols. An SIP environment and a Web environment are connected to a network. The SIP environment includes an SIP server, an SIP database, an SIP application server, an SIP application and a Web accessor component. The Web environment includes a Web server, a Web database, a Web application server, a Web application and an SIP accessor component. The management information is transmitted and received by cooperation management components, arranged in a Web accessor component and an SIP accessor component, respectively, in such a manner that the SIP environment and the Web environment cooperate with each other to provide services.

12 Claims, 13 Drawing Sheets

(56) References Cited

OTHER PUBLICATIONS

Japanese Office Action mailed Jun. 3, 2008, issued in corresponding Japanese Application 2003-296242 with an English translation of the Office Action.

The Production Guide: Product & Solution "Notable VoIP Solution", Computer & Network LAN, vol. 21, No. 6, pp. 86-87, Jun. 1, 2003, Ohmsha, Japan.

"Web Based Middleware for Integrating Home Appliances", Daiki Uneo, Journal of Information Processing, vol. 44, No. SIG10 (ACS2), pp. 177-186, Jul. 15, 2003, Information Processing Society of Japan.

Japanese Office Action mailed Nov. 25, 2008, issued in corresponding Japanese Application 2003-296242 with an English translation of the Office Action.

"SIP Servlet API Version 1.0" dynamicsoft Inc., Feb. 4, 2003.

* cited by examiner

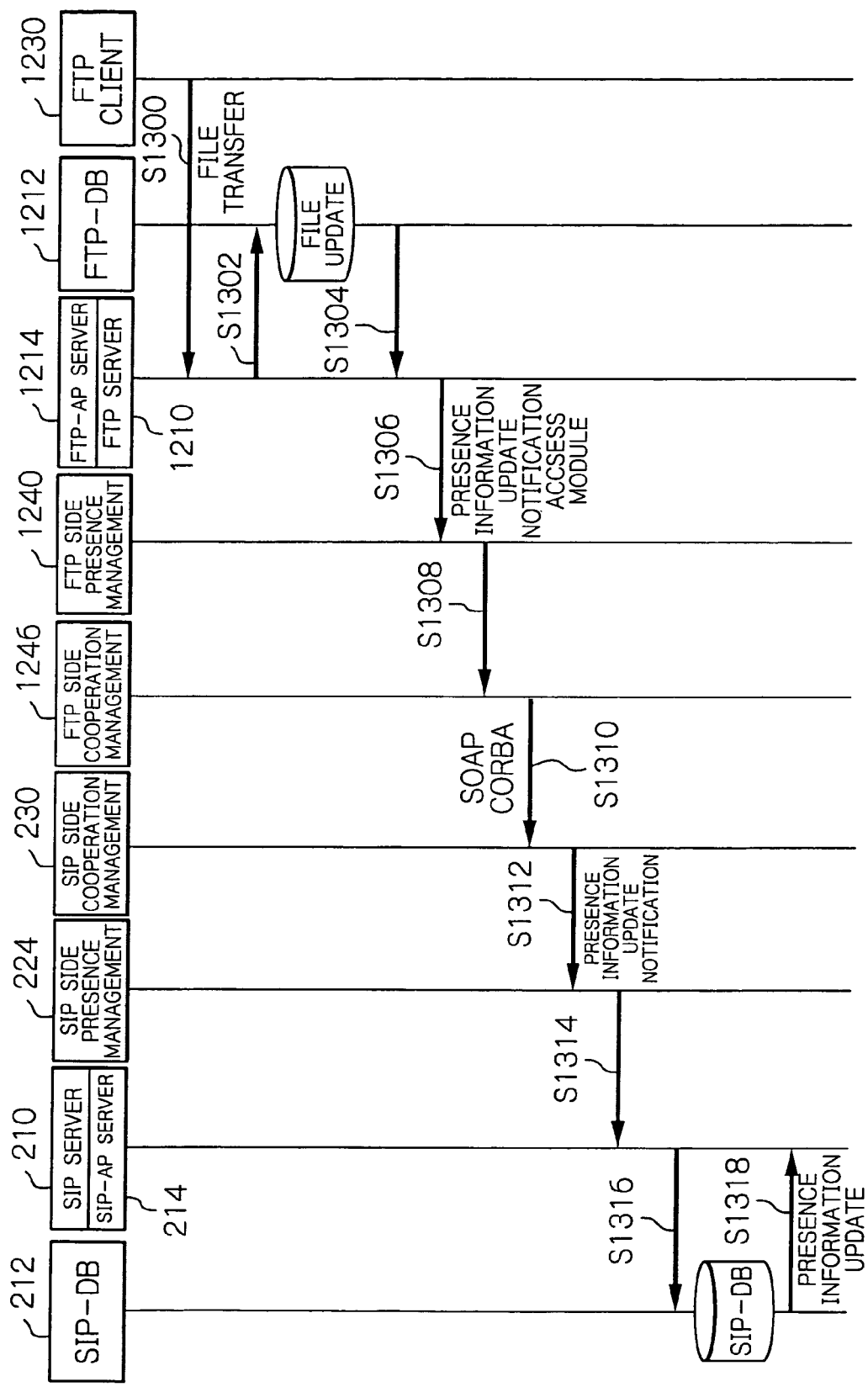

SERVICE PROVIDING SYSTEM ALLOWING FLEXIBLE COOPERATION BETWEEN APPLICATIONS EXPLOITING DIFFERENT PROTOCOLS

BACKGROUND OF THE INVENTION

1. Field of the Invention

The present invention relates to a service providing system, and more particularly to a service providing system which fuses together an SIP (Session Initiation Protocol) server environment, such as a VoIP (Voice over Internet Protocol) server environment representatively implemented by e.g. the SIP, and a Web-AP server environment, providing an AP (application: application software) on the Web (World Wide Web) environment, to provide a VoIP-Web convergence application software (AP) service. The present invention also relates to a method, apparatus and a program sequence providing such a service.

2. Description of the Background Art

Up to now, attempts were not made in fusing together the application environment based upon the SIP by the SIP server employing the SIP and the application environment based upon the Web by a Web server employing e.g. the HTTP (Hyper Text Transfer Protocol), but server systems were constructed separately from each other as distinct AP environments. The reason is that the respective systems were used for different purposes in such a manner that the Web-AP environment is used for constructing an information-providing type application service, furnished by the Internet service provider (ISP) or information systems of business organizations, while the SIP-AP environment is used for constructing the telephone-based services.

In interconnecting these server environments, implemented by the different communication protocols, for realization of concerted operations, the routine practice was to use a gateway for protocol conversion as a mediating system. Specifically, an HTTP-SIP conversion gateway was additionally needed for implementing the function of interconnection conversion between the HTTP as the Web environment protocol and the SIP as the SIP environment protocol.

The SIP is presented in the Request for Comments: 3261 (RFC-3261) by J. Rosenberg et al. "SIP: Session Initiation Protocol", June 2000, Internet Engineering Task Force (IETF) Network Working Group, Obsoletes: 2543, category: Standard Track, (retrieved on Apr. 9, 2003, on the Internet site, www.ietf.org/rfc/rfc3261.text). Also refer to "Session Initiation Protocol Textbook", first edition, edited by Y. Chimura et al. Japan, published by Kabushiki Kaisha IDG Japan, on May 2, 2003. The HTTP is presented by RFC-2068, for example, R. Fielding et al. "Hypertext Transfer Protocol/1.1-HTTP/1.1", January 1997, Network Working Group, category: Standards Track, (retrieved on Apr. 9, 2003 on the Internet site, www.w3c.org/Protocols/rfc2068/rfc2068).

However, the HTTP-SIP conversion gateway suffered from the problem that it was restricted to a simple function of protocol conversion by a protocol conversion rule built from the outset in the HTTP-SIP conversion gateway device.

For example, if the function of accessing (retrieving, registering or updating) the presence information, supervised on a database in the SIP environment (SIP-DB), based on the request contents by the HTTP, is set in the HTTP-SIP conversion gateway, then only this function would be implemented. However, the function not set in the HTTP-SIP conversion gateway device could not be utilized. Moreover, it was difficult for the developer of the application (AP), such as the SIP or Web server, to extend the function of the HTTP-SIP concerted operation. It was also difficult to flexibly exploit and control the functions, built into the HTTP-SIP conversion gateway, from the AP side of these servers.

SUMMARY OF THE INVENTION

In view of the above deficiencies of the prior art, it is an object of the present invention to provide a service providing system that may be used for realizing a click-to-dial application (AP) system of selecting a counterpart party of a telephone call (e.g. with a mouse click) on a Web browser to initiate the telephone call between the a calling and a called party, in such a manner as to resolve the problem of extensibility of the cooperating-system application employing the conventional HTTP-SIP conversion gateway, to enable flexible cooperation between the applications exploiting different protocols. A method, apparatus and a program sequence providing such a service are also provided.

For accomplishing the above object, the present invention provides a service providing system in which a first communication environment device exploiting a first communication protocol and a second communication environment device exploiting a second communication protocol render a service for a client device. The first communication environment device includes a first application provider for providing an application by the first communication protocol to the client device and a first manager for accessing and supervising the second communication environment device, while the second communication environment device includes a second application provider for providing an application by the second communication protocol to the client device and a second manager for accessing and supervising the first communication environment device. The first and second managers transmit and receive the cooperation information for cooperating with each other to render a service to the client device.

Preferably, the first manager may include a first cooperation manager for cooperating with the second communication environment device, and the second manager may include a second cooperation manager for cooperating with the first communication environment device, the cooperation information being transmitted between the first and second cooperation manager.

Preferably, the first manager may include a first presence manager for operating and managing presence information, and the second manager may include a second presence manager for accessing the first presence manager. Preferably, the first manager may include a first user manager for operating and managing user information in the first communication protocol and the second manager includes a second user manager for accessing the first user manager. Preferably, the second user manager may access the first user manager using a stub conforming to a remote access. Preferably, the first manager may include a first signaling manager for operating and managing signaling information in the first communication protocol and the second manager may include a second signaling manager for accessing the first signaling manager.

Preferably, the first and second cooperation managers may be interconnected over a network and transmit and receive the cooperation information in accordance with a predetermined protocol. Preferably, the predetermined protocol may be SOAP (Simple Object Access Protocol) or CORBA (Common Object Request Broker Architecture).

The first communication environment device and the second communication environment device may be provided in the same server. Preferably, the first manager in this case may transmit and receive the cooperation information using a function call.

Preferably, the first communication environment device may provide the service for the client device using a procedure by SIP as the first communication protocol, while the second communication environment device may provide the service for the client device using a procedure by HTTP as the second communication protocol. The second communication environment device may provide the service for the client device using a procedure by FTP as the second communication protocol.

For accomplishing the above-stated object, the present invention also provides a service providing apparatus providing a service for a client device, using a first communication protocol, and the apparatus is connected over a network to a communication environment device exploiting a second communication protocol, and comprises a first application provider for providing an application by the first communication protocol to the client device and a manager for accessing and managing the communication environment device. The manager transmits and receives cooperation information for cooperating with the communication environment device for providing a service to the client device. Preferably, the manager may include a first cooperation manager for cooperating with the communication environment device, and the cooperation information is transmitted between the first cooperation manager and the communication environment device in accordance with a protocol.

For accomplishing the above-stated object, the present invention also provides a method of providing a service for a client by a first communication environment device exploiting a first communication protocol and a second communication environment device exploiting a second communication protocol device. The method comprises a first service providing step of providing an application service from the first communication environment device to the client device, using the first communication protocol, a first management step of accessing to the second communication environment device from the first communication environment device for managing the second communication environment device, a second service providing step of providing an application service from the second communication environment device to the client device, using the second communication protocol, a second management step of accessing the first communication environment device from the second communication environment device for managing the first communication environment device, and a cooperation information transmitting step of transmitting cooperation information for the first and second communication environment devices to cooperate with each other, from the first communication environment device to the second communication environment device.

Preferably, the cooperation information transmitting step may transmit a response to the cooperation information, transmitted to the second communication environment device, from the second communication environment device to the first communication environment device. Preferably, the first management step may include a first presence management step of operating and managing presence information, while the second management step may include a second presence management step of accessing the presence information. Preferably, the first management step may also include a first user management step of operating and managing user information in the first communication protocol, and the second management step accesses the user information using a stub conforming to a remote access. Preferably, the first management step may include a first signaling step of operating and managing signaling information in the first communication protocol, and the second management step may include a second signaling step of accessing the signaling information.

Preferably, the cooperation information transmitting step may transmit the cooperation information between the first and second communication environment devices, using the SOAP (Simple Object Access Protocol). Preferably, the cooperation information transmitting step may transmit the cooperation information between the first and second communication environment devices, using the CORBA (Common Object Request Broker Architecture). In the case the first and second communication environment devices are housed within the same server, the first and second management steps may preferably transmit and receive the cooperation information using a function call.

The first communication environment device may preferably render the service for the client device, using the procedure by SIP as the first communication protocol, and using the procedure by HTTP as the second communication protocol. The second communication environment device may preferably render the service for the client device using the procedure by FTP as the second communication protocol.

For accomplishing the above-described object, the present invention also provides a service providing program controlling a computer, in which a first communication environment device exploiting a first communication protocol and a second communication environment device exploiting a second communication protocol render a service for a client device, and a computer-readable recording medium having the service providing program recorded thereon. The service providing program comprises a first service providing step of providing an application service from the first communication environment device to the client device, using the first communication protocol, a first management step of accessing the second communication environment device from the first communication environment device for managing the second communication environment device, a second service providing step of providing an application service from the second communication environment device to the client device, using the second communication protocol, a second management step of accessing the first communication environment device from the second communication environment device for managing the first communication environment device, and a cooperation information transmitting step of transmitting cooperation information for the first and second communication environment devices to cooperate with each other from the first communication environment device to the second communication environment device.

Preferably, the cooperation information transmitting step may transmit a response to the cooperation information, transmitted to the second communication environment device, from the second communication environment device to the first communication environment device. Preferably, the first management step may include a first presence management step of operating and managing presence information, while the second management step includes a second presence management step of accessing the presence information. Preferably, the first management step may also include a first user management step of operating and managing user information in the first communication protocol, and the second management step accesses the user information using a stub conforming to remote access. Preferably, the first management step may include a first signaling step of operating and managing signaling information in the first communication protocol, and the second management step may include a second signaling step of accessing the signaling information.

Preferably, the cooperation information transmitting step may transmit the cooperation information between the first and second communication environment devices, using the SOAP (Simple Object Access Protocol). Preferably, the cooperation information transmitting step may transmit the cooperation information between the first and second communication environment devices, using the CORBA (Common Object Request Broker Architecture).

In the case the first and second communication environment devices are housed within the same server, the first and second management steps may preferably transmit and receive the cooperation information using a function call. The first communication environment device may preferably render the service for the client device using the procedure by SIP as the first communication protocol, and using the procedure by HTTP as the second communication protocol. The second communication environment device may preferably render the service for the client device using the procedure by FTP as the second communication protocol.

According to the present invention, when the first communication environment device, exploiting the first communication protocol, and the second communication environment device, exploiting the second communication protocol, respectively render the service for a client device, the first manager of the first communication environment device and the second manager of the second communication environment device transmit and receive the cooperation information for cooperating with each other to render the service for the client device.

Since the first and second communication environment devices are able to cooperate with each other, in the manner described above, it is possible to render services without employing a gateway performing e.g. the protocol conversion. Hence, the applications may be extended and cooperate with one another, by the first and second communication environment devices, without limitation to the functions of the gateway, while the applications employing different protocols are able to cooperate flexibly.

BRIEF DESCRIPTION OF THE DRAWINGS

The objects and features of the present invention will become more apparent from consideration of the following detailed description taken in conjunction with the accompanying drawings, in which:

FIG. 13 schematically shows the operating sequence at the time of notifying the updating of the presence information of the embodiment shown in FIG. 12.

DESCRIPTION OF THE PREFERRED EMBODIMENTS

Figure 1:
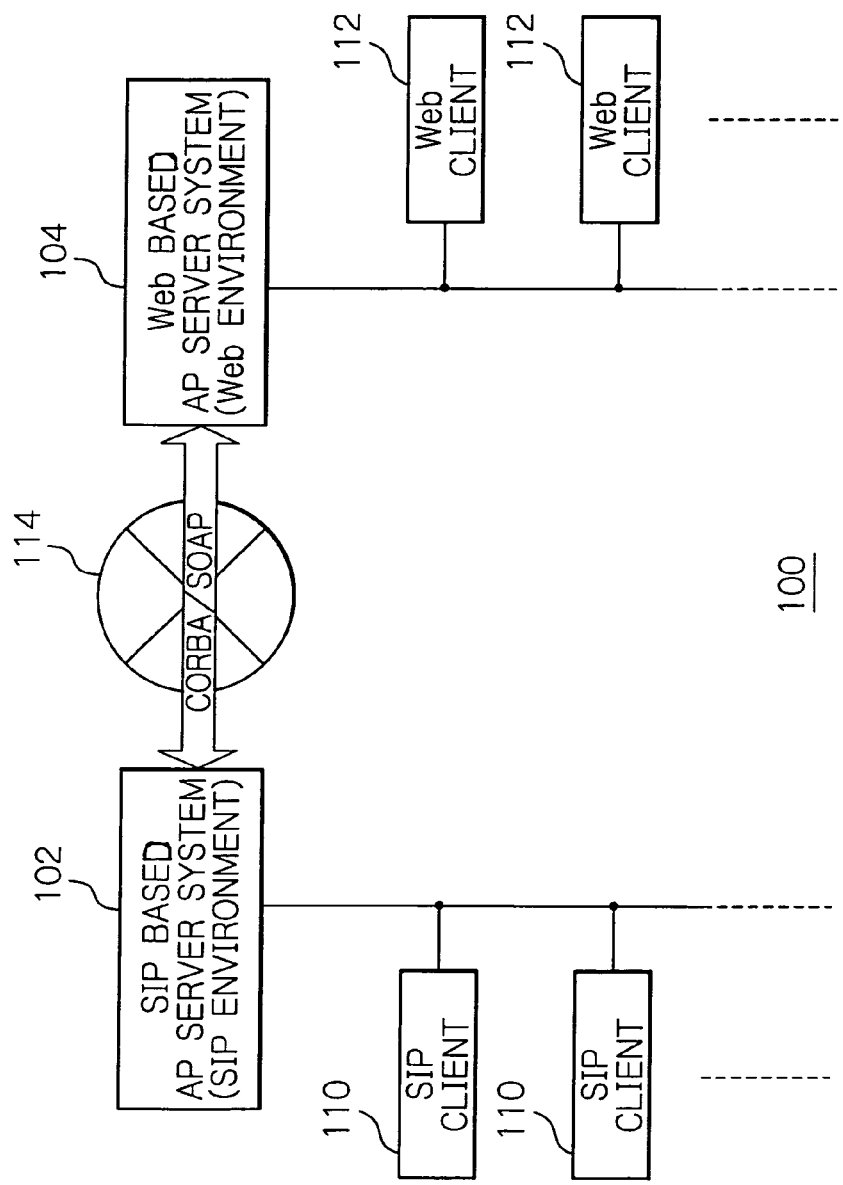
FIG. 1 is a schematic block diagram showing an illustrative structure of a cooperating system embodying the present invention.

Referring to the drawings, a preferred embodiment of a service providing system of the present invention will be described in detail. FIG. 1 schematically shows a cooperating system 100 of a first embodiment of a service providing system of the present invention. As shown, the cooperating system 100 is a service providing system comprising an interconnection over a network 114 of an SIP based AP server system 102, managed using the SIP (sometimes referred to below as SIP environment), and a Web based AP server system 104, managed using the HTTP (sometimes referred to below as Web environment) to provide an application service for an SIP client 110 connected to the SIP environment 102 and a Web client 112 connected to the Web client 112. In the following, parts not directly pertinent to understanding the present invention will not be shown nor described.

In the present embodiment, the SIP environment 102 and the Web environment 104 are arranged on network environments 114 belonging to respectively different network domains. Moreover, although the SIP environment 102 and the Web environment 104 are arranged in respective server computers, they are merely illustrative. The SIP environment 102 may be constructed by plural computers in a LAN environment in one domain. Similarly, the Web environment 104 may be formed by plural computers in a LAN environment in another domain.

Figure 2:
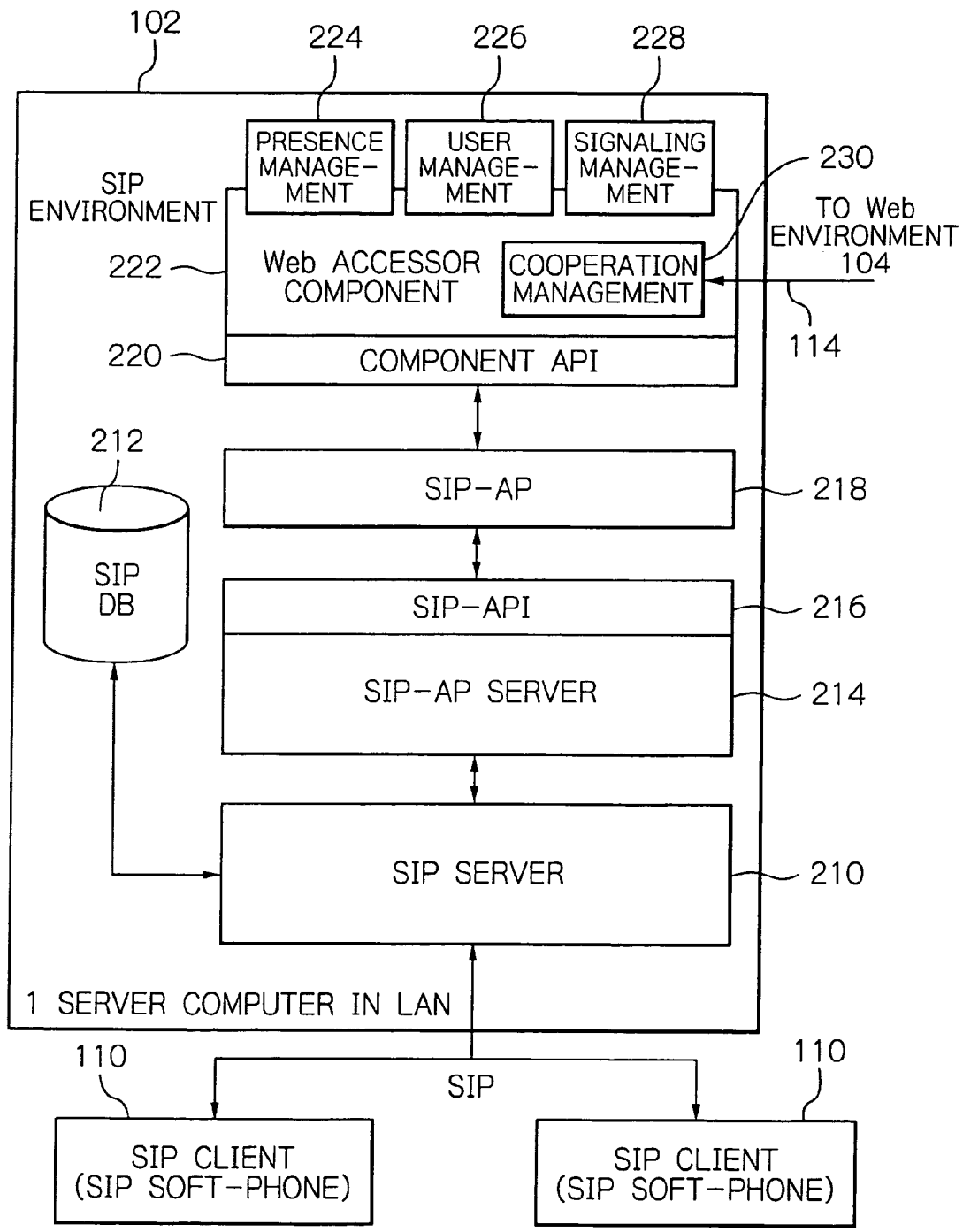
FIG. 2 is a schematic block diagram showing an illustrative structure of an SIP based AP server system (SIP environment)

FIG. 2 shows an illustrative structure of an SIP based AP server system (SIP environment). The SIP environment 102 includes an SIP server 210 handling and supervising the SIP, conforming e.g. to RFC-3261, and which is prescribed by the IEFT (Internet Engineering Task Force). The SIP server 210 includes e.g. an SIP proxy server function, an SIP registration server function and an SIP location server function. The SIP proxy server function is to transfer an SIP message as a proxy for a client. The SIP registration server function is to supervise the client registration. The SIP location server function is to supervise e.g. the address information of a registered client.

The SIP environment 102 includes an SIP database (SIP-DB) 212, connected to the SIP server 210, and configured for storage of the information, such as the presence information or the user information supervised by the SIP server 210. The user information is the address information of the client or the information for authentication. The presence information is of indicating whether or not the client is connected, whether or not the client is booted and utilized, or whether or not a client is being connected to another client.

The SIP environment 102 includes an SIP-AP server 214, connected to the SIP server 210 and configured for operating an application (AP) adapted for operating the SIP protocol managed by the SIP server 210. The SIP-AP server 214 has the function of operating the SIP request, received by the SIP server 210, such as session establishment, confirmation response, call end or presence change, as well as the function of issuing a request to the SIP server 210.

The SIP-AP server 214 includes an SIP-API 216. The SIP-API 216 is an application interface provided by the SIP-AP server 214. For example, the SIP Servlet API may be applied, of which the operation for standardization is now proceeding in JCP (Java (trademark) Community Process).

An SIP-AP 218 is connected to this SIP-API 216. The SIP-AP 218 is an SIP application (AP), constructed by the SIP-API 216, and operating on the SIP-AP server 214. The SIP-AP is a program module, such as IP telephone program, an instant message program, a TV telephone program and a presence communication program.

To the SIP-AP 218, a Web accessor component 222 is connected through a component API 220. The Web accessor component 222 is a set of plural components (library software components) for the SIP-AP 218 to cooperate with the Web environment 104, and includes, for example, a presence management component 224, a user management component 226, a signaling management component 228, and the component API 220.

The Web accessor component 222 is a library software, called when the SIP-AP 218 is in operation. These libraries are used when the SIP-AP 218 communicates with a function on the Web environment 104 (SIP accessor component as later explained). These libraries may be used in combination from the SIP-AP 218 side depending on which function is to be implemented as the concrete SIP-AP 218. It is possible to add components other than the components 224, 226, 228, depending on the usage and application, by way of extension. By this addition and extension of the components, the cooperation with the Web environment 104 may be enhanced in variation.

Turning to the respective components, the presence management component 224 is adapted for operating and supervising the presence information managed in the SIP environment 102. The user management component 226 is adapted for operating and managing the user information managed in the SIP environment 102, and the signaling management component 228 is for operating and managing the SIP signaling by exploiting the SIP server 210 in the SIP environment 102.

The Web accessor component 222 includes a cooperation management component 230. The cooperation management component 230 represents a communication environment cooperating with a cooperation management component, provided in a mating fashion in the Web environment 104, to access the presence management component 224, the user management component 226 and the signaling management component 228 from the Web environment 104 side, as well as to access the Web environment 104 side from the SIP environment 102 side. The cooperation management component 230 transmits and receives the information for cooperation by e.g. the SOAP (Simple Object Access Protocol) and CORBA (Common Object Request Broker Architecture) to provide the cooperative management environment.

The component API 220, provided in the Web accessor component 222, is an application interface (API) for the SIP-AP 218 to exploit the respective components.

Meanwhile, the SIP client 110, connected to the SIP server 210, is a client environment exploiting the function provided by the SIP-AP 218, and maybe exemplified by SIP software phone, or 'soft-phone', for performing telephone communication by SIP.

Figure 3:
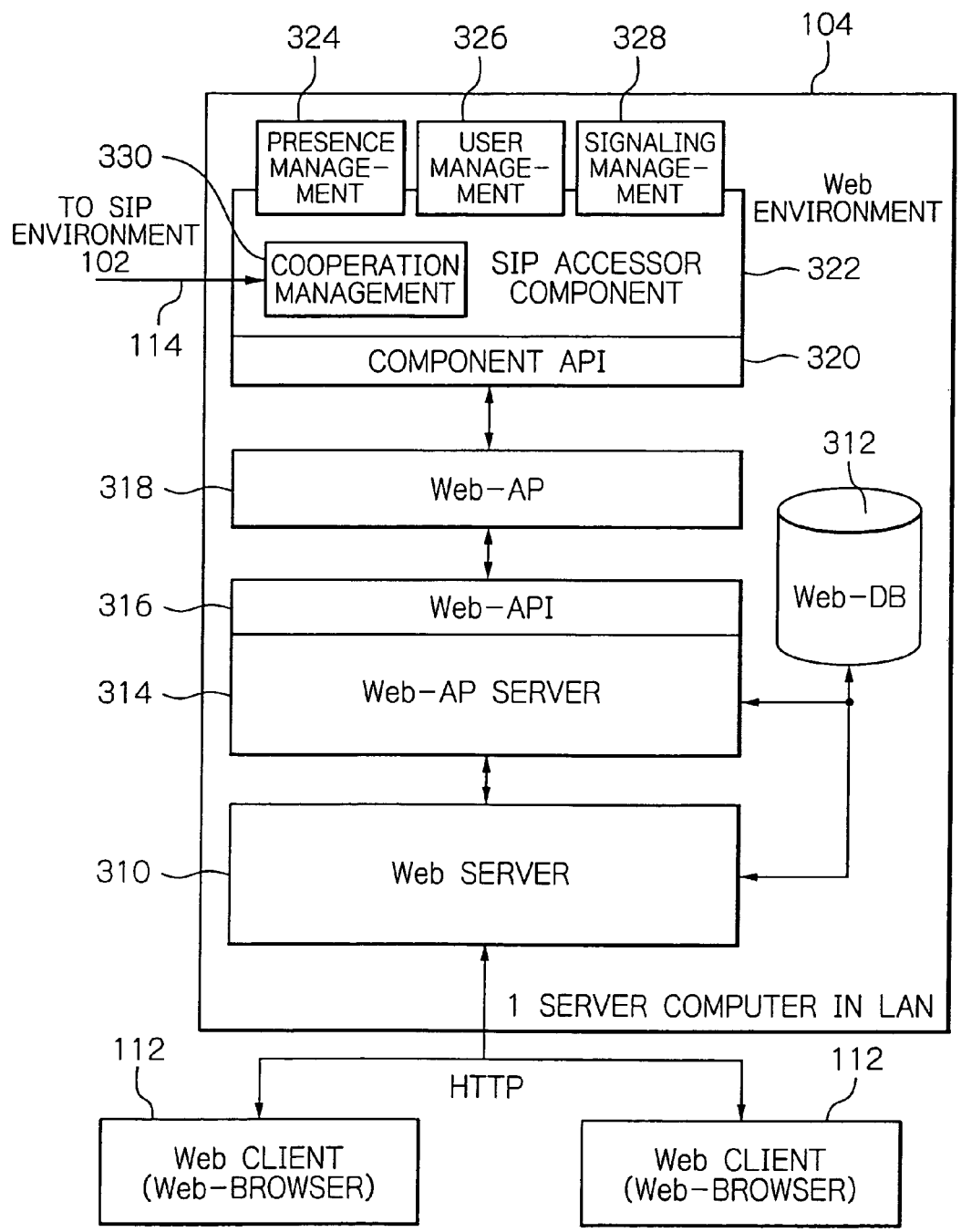
FIG. 3 is a schematic block diagram showing an illustrative structure of a Web based AP server system (SIP environment)

FIG. 3 shows an illustrative structure of the Web based AP server system (Web environment) 104. The Web environment 104 includes a Web server 310 for handling and managing the HTTP, a database Web-DB 312 for storage of the information, such as the toll information and the use log of the client, as the information managed by the Web server 310, and a Web-AP server 314 for running an application AP for operating the Web protocol (HTTP) managed by the Web server 310. The Web-AP server 314 may be exemplified by an open-source TOMCAT and WebLogic by BEA, Inc.

The Web-AP server 314 includes a Web-API 316 of the application (AP) interface provided by the Web-AP server 314. The Web-API 316 may be exemplified by, for example, the HTTP Servlet API or EJB (Enterprise Java Beans) prescribed e.g. in J2EE (Java2 Enterprise Edition).

The Web environment 104 includes a Web-AP 318, constructed via web-API 316 and run on the Web-AP server 314. This Web-AP 318 includes an application program (AP), such as Internet shopping mall program, portal programs for business organizations and contents distribution programs.

To the Web-AP 318, connected is an SIP accessor component 322 via a component API 320. The SIP accessor component 322 is a set of plural components (library software components) for the Web-AP 318 to cooperate with the SIP environment 102, and includes e.g. a presence management component 324, a user management component 326, a signaling management component 328 and the component API 320.

The SIP accessor component 322 is a sort of library software, called when the SIP-AP 218 is in operation. These libraries are used when the SIP-AP 218 communicates with the Web accessor component 222 on the SIP environment 102, FIG. 2. These libraries may be used in combination from the Web-AP 318 side depending on which function cooperating with the SIP-AP 218, FIG. 2, is to be implemented as the concrete Web-AP 318. It is possible to add components other than the components 324, 326, 328, depending on the usage and application, by way of extension, by the SIP accessor component 322 and the Web accessor component 222 paired together. By this addition and extension of the components, the cooperation with the SIP environment 102 may be enhanced in variation.

Turning to the respective components, the presence management component 324 is arranged in the Web environment 104 for accessing the presence information managed in the SIP environment 102, the user management component 326 is arranged in the Web environment 104 for accessing the user information managed in the SIP environment 102, and the signaling management component 328 is arranged in the Web environment 104 for exploiting the SIP signaling by exploiting the SIP server 210 in the SIP environment 102.

The SIP accessor component 322 includes a cooperation management component 330. The cooperation management component 330 represents a communication environment cooperating with a cooperation management component, 230 provided in a mating fashion in the Web accessor component 222 in the SIP environment 102 to access the SIP environment 102 side by exploiting the presence management component 324, the user management component 326 and the signaling management component 328, as well as to access the Web environment 104 side from the SIP environment 102 side. The cooperative management environment is provided by the aforementioned SOAP or CORBA in a mating fashion with the cooperation management component 230 in the SIP environment 102.

The component API 320, provided in the SIP accessor component 322, is an application interface (API) for the SIP-AP 318 to exploit the respective components.

Meanwhile, the Web client 112, connected to the Web server 310, is a client environment having the function of e.g. a Web browser provided by the Web-AP 318 on connection to the Web server 310.

The detailed functional structure will now be described of the Web accessor component 222 of the SIP environment 102 shown in FIG. 2 and the SIP accessor component 322 of the Web environment 104 shown in FIG. 3.

Figure 4:
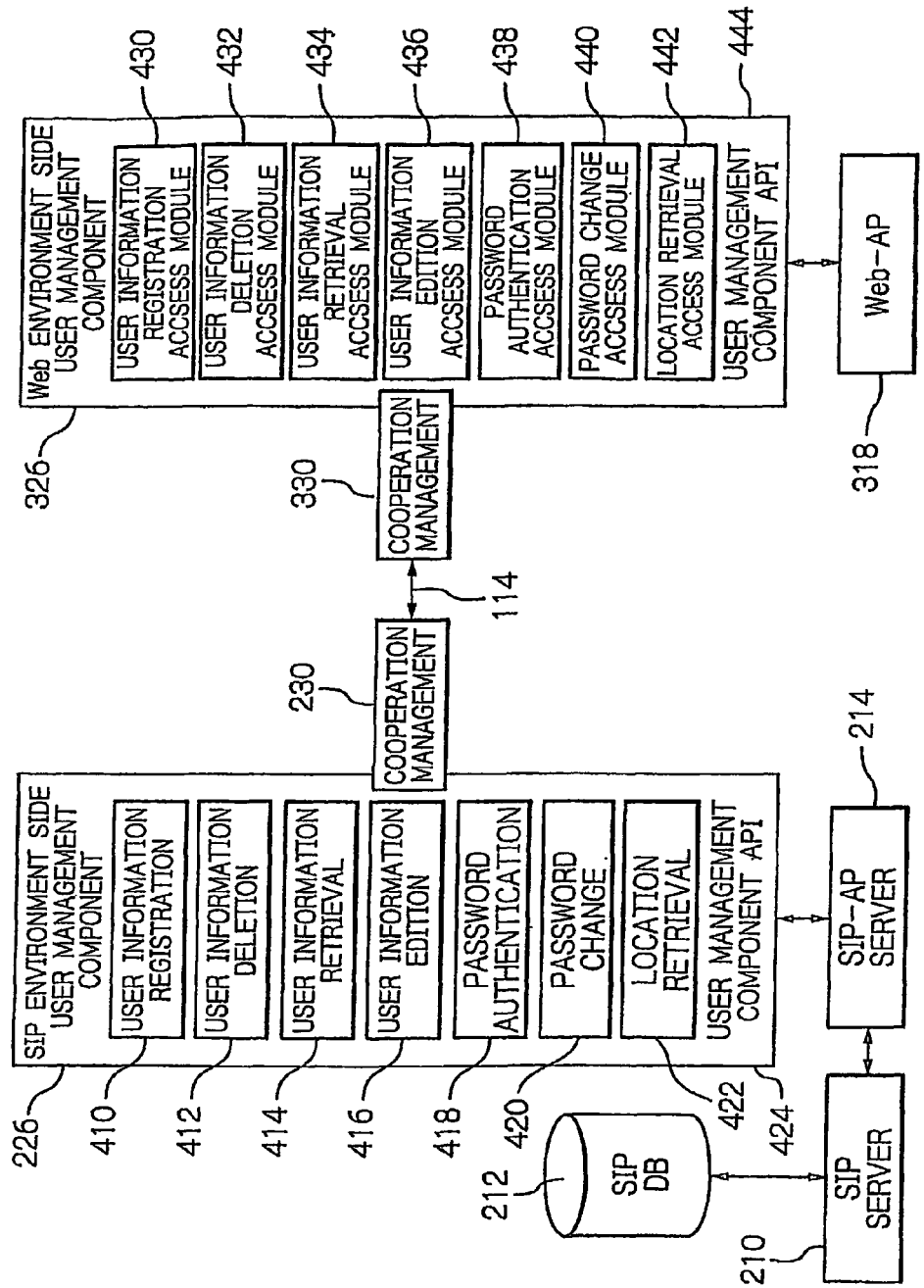
FIG. 4 is a schematic block diagram showing an illustrative structure of a user management component and a cooperative management component on the SIP and the Web environment.

FIG. 4 shows the user management components 226, 326 of the SIP environment 102 and the Web environment 104. The user management component 226, on the SIP environment 102 side, is responsible for operation management of the user information and the location information, as the SIP-related information, supervised on the SIP-DB 212, and includes, as representative of functional modules, a user information registration module 410, for registering the user information, a user information deletion module 412, for deleting the registered user information, a user information retrieving module 414, for retrieving the registered user information, a user information editing module 416, for editing the registered user information, a password authentication module 418, for authenticating the accessing user, a password change module 420 for changing the password for user authentication, and a location retrieving module 422 for retrieving the SIP location information. The user management component 226 also includes a user management component API 424.

The user management component 326, on the Web environment 104 side, includes modules for accessing respective modules in the user management component 226 on the SIP environment 102 side by communication between the cooperation management component 330 and the cooperation management component 230. The user management component 326 includes a user information registration access module 430 for accessing the user information registration module 410, a user information deletion access module 432 for accessing the user information deletion module 412, a user information retrieving access module 434 for accessing the user information retrieving module 414, a user information editing access module 436 for accessing the user information editing module 416, a user information authentication access module 438 for accessing the password authentication module 418, a user information change access module 440 for accessing the password change module 420, and a location retrieving access module 442 for accessing the location retrieving module 422. The user management component 326 also includes a user management component API 444.

The user management component 326 implements the access function from the Web environment 104 side, by accessing from within the module 326 to a mating functional module in the user management component 226 on the SIP environment 102 side.

Figure 5:
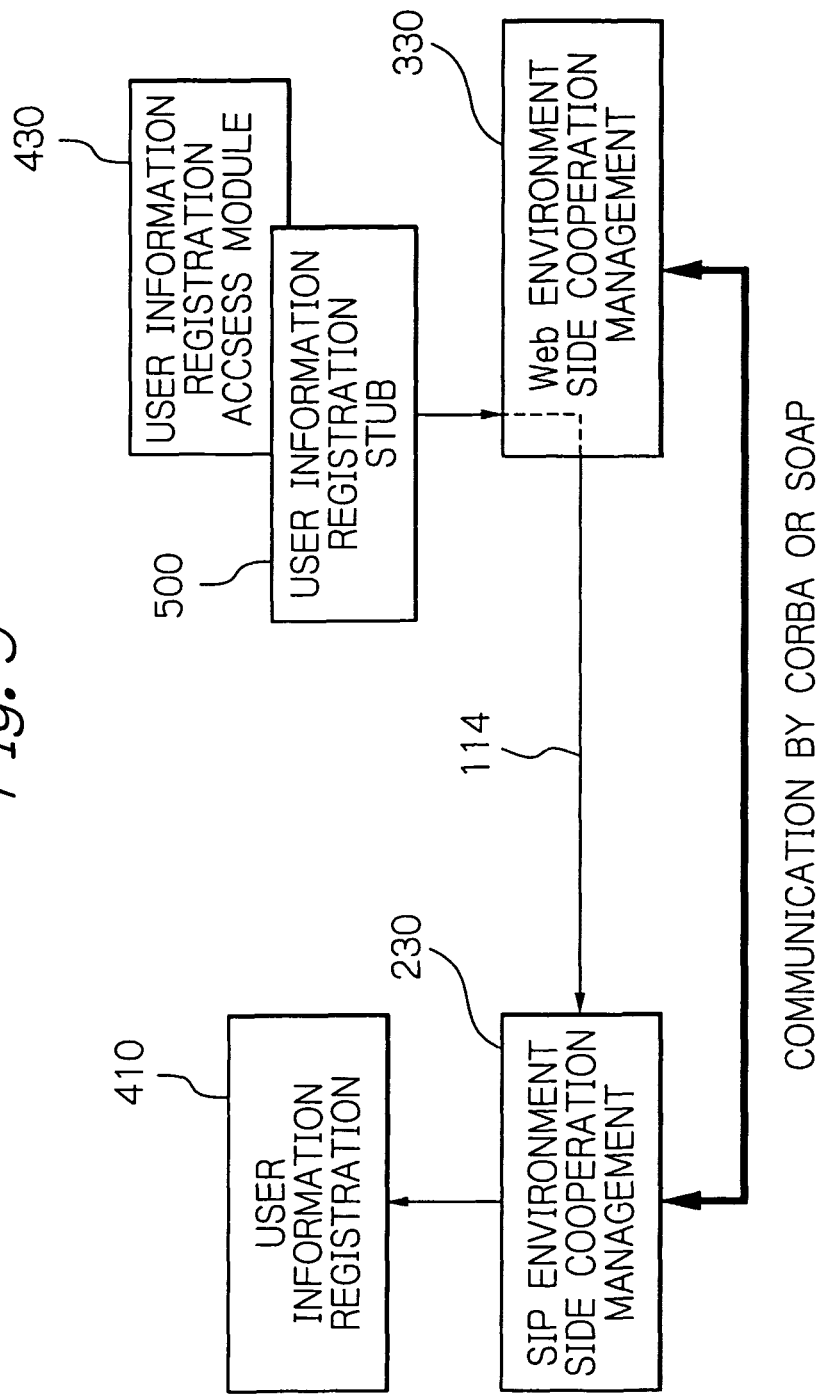
FIG. 5 schematically shows the state of cooperative management.

FIG. 5 shows the communication structure between the cooperation management component 330 and the cooperation management component 230. As shown, in exploiting e.g. the function for user information registration from the Web environment 104 side, the user information registration access module 430 communicates via the cooperation management components 230, 330 by calling a user information registration stub 500 for accessing the user information registration module 410 from the remote environment. The user information registration stub 500 differs with a unit used for implementing the remote access, such that, in the case of CORBA or SOAP cooperation, the CORBA stub or the stub for SOAP access may be used, respectively. In the following, the present method is used for communication between the cooperation management component 330 and the cooperation management component 230.

Figure 6:
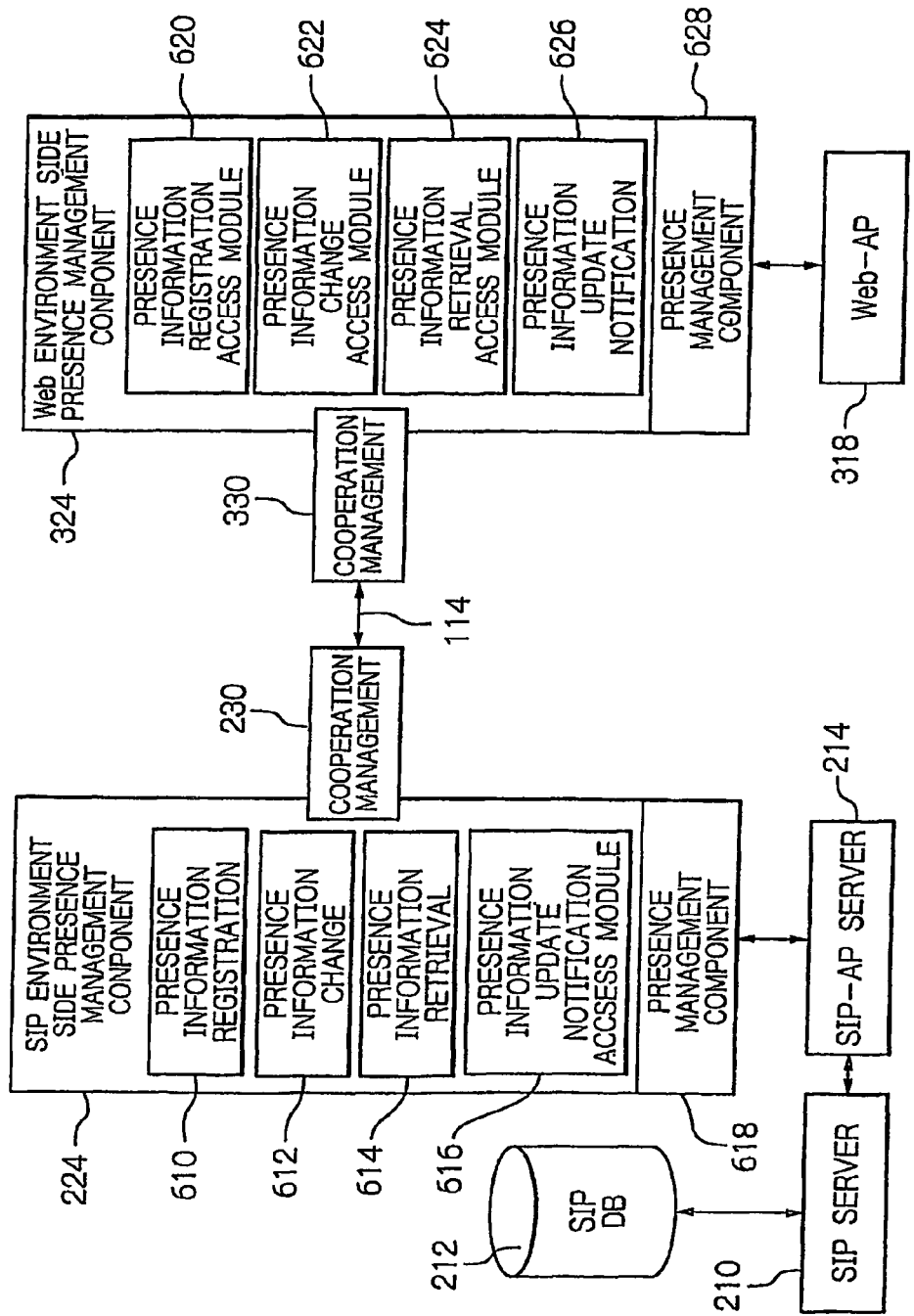
FIG. 6 is a schematic block diagram showing an illustrative structure of a presence management component and a cooperative management component on the SIP and the Web environment.

FIG. 6 shows the presence management components 224, 324 of the SIP environment 102 side and the Web environment 104 side. The presence management component 224 on the SIP environment 102 side is responsible for operation and management of the presence information supervised on the SIP-DB 212, and includes, as representative of functional modules, a presence information registration module 610, for registering the presence information, a presence information change module 612, for changing the registered presence information to the latest information, a presence information retrieving module 614, for retrieving the registered presence information, and a presence information update notification access module 616 for notifying the latest presence information, updated via the SIP server 210, to the presence management component 324 on the Web environment 104 side. The presence management component 224 further includes a presence management component API 618.

The presence management component 324, on the Web environment 104 side, includes modules for accessing respective modules in the presence management component 224 on the SIP environment 102 side by communication between the cooperation management component 330 and the cooperation management component 230. Specifically, the presence management component 324 includes a presence information registration access module 620 for accessing the presence information registration module 610, a presence information change access module 622 for accessing the presence information change module 612, a presence information retrieving access module 614 for accessing the presence information retrieving access module 622, and a presence information update notification module 626 accessed by a presence information update notification access module 616. The presence management component 324 also includes a presence management component API 628.

As for the presence information registration function, the presence information change function and the presence information retrieving function, the mating functional modules in the presence management component 224 on the SIP environment 102 side are accessed from the respective modules in the presence management component 324 to implement the access function.

The presence information update notification module 626 is booted after information notification from the presence information update notification access module 616 in the presence management component 224 on the SIP environment 102 side. The so notified presence information is converted into a displayable form on e.g. the Web browser.

Figure 7:
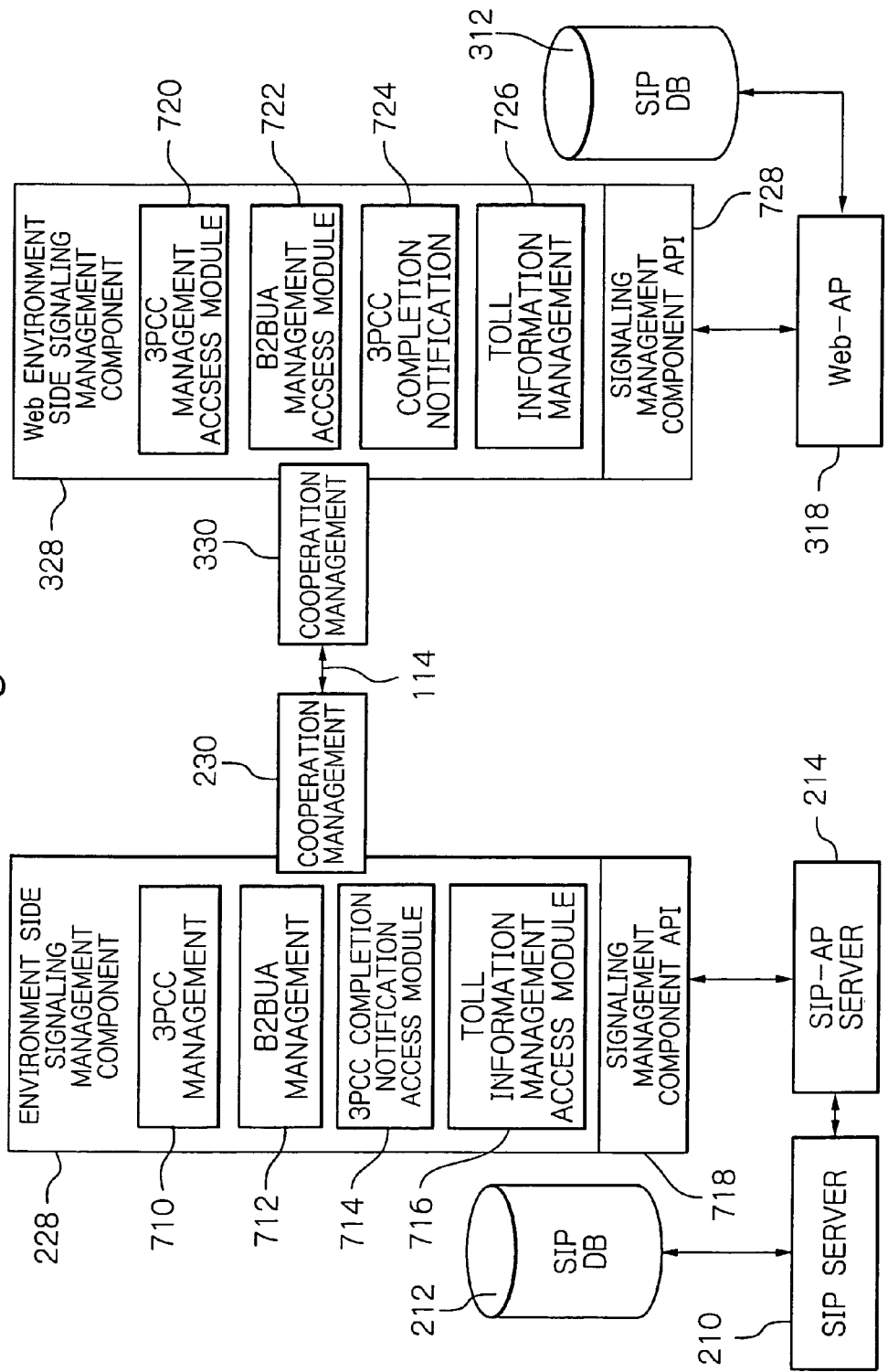
FIG. 7 is a schematic block diagram showing an illustrative structure of a signaling management component and a cooperative management component on the SIP and the Web environment.

FIG. 7 shows the signaling management components 228, 328 of the SIP environment 102 and the Web environment 104. The signaling management component 228 on the SIP environment 102 side is responsible for operation and management of SIP signaling by exploiting the SIP server 210, and includes, as representative of functional modules, a 3PCC (3rd Party Call Control) management protocol 710 for providing the function of communication between two parties, by exploiting the SIP server 210, for implementing the application (AP), such as Click to Dial, a B2BUA (Back to Back User Agent) management module 712 for implementing the communication between the two parties as two discrete SIP sessions, a 3PCC end notification access module 714 for notifying the completion of 3PCC, executed via the SIP server 210, to the signaling management component 328 on the Web environment 104 side, and a toll information management access module 716 for carrying out the tolling for service exploitation, with the end of 3PCC, carried out via the SIP server 210, as an incentive, to exploit a toll information management module 726 provided in the signaling management component 328 on the Web environment 104 side.

The signaling management component 328 on the Web environment 104 side is formed by a module for implementing communication with respective functional modules in the signaling management component 228 on the SIP environment 102 side by communication between the cooperation management component 330 and the cooperation management component 230. Specifically, the signaling management component 328 includes a 3PCC management access module 720 for accessing a 3PCC management module 710 in the signaling management component 228 on the SIP environment 102 side, from within the Web environment 104, a B2BUA management access module 722 for accessing a B2BUA management module 712 on the SIP environment 102 side, a 3PCC end notification module 724 for recognizing the end of the execution of the 3PCC, requested from within the Web environment 104, subject to receipt of the notification of the end of execution of 3PCC management within the signaling management component 228 on the SIP environment 102 side, and a toll information management module 726 for managing the toll information of the service rendered within the signaling management component 228 on the SIP environment 102 side. The toll information management module 726 preferably includes a unit for cooperation with another toll system constructed externally of the present cooperating system 100.

Figure 8:
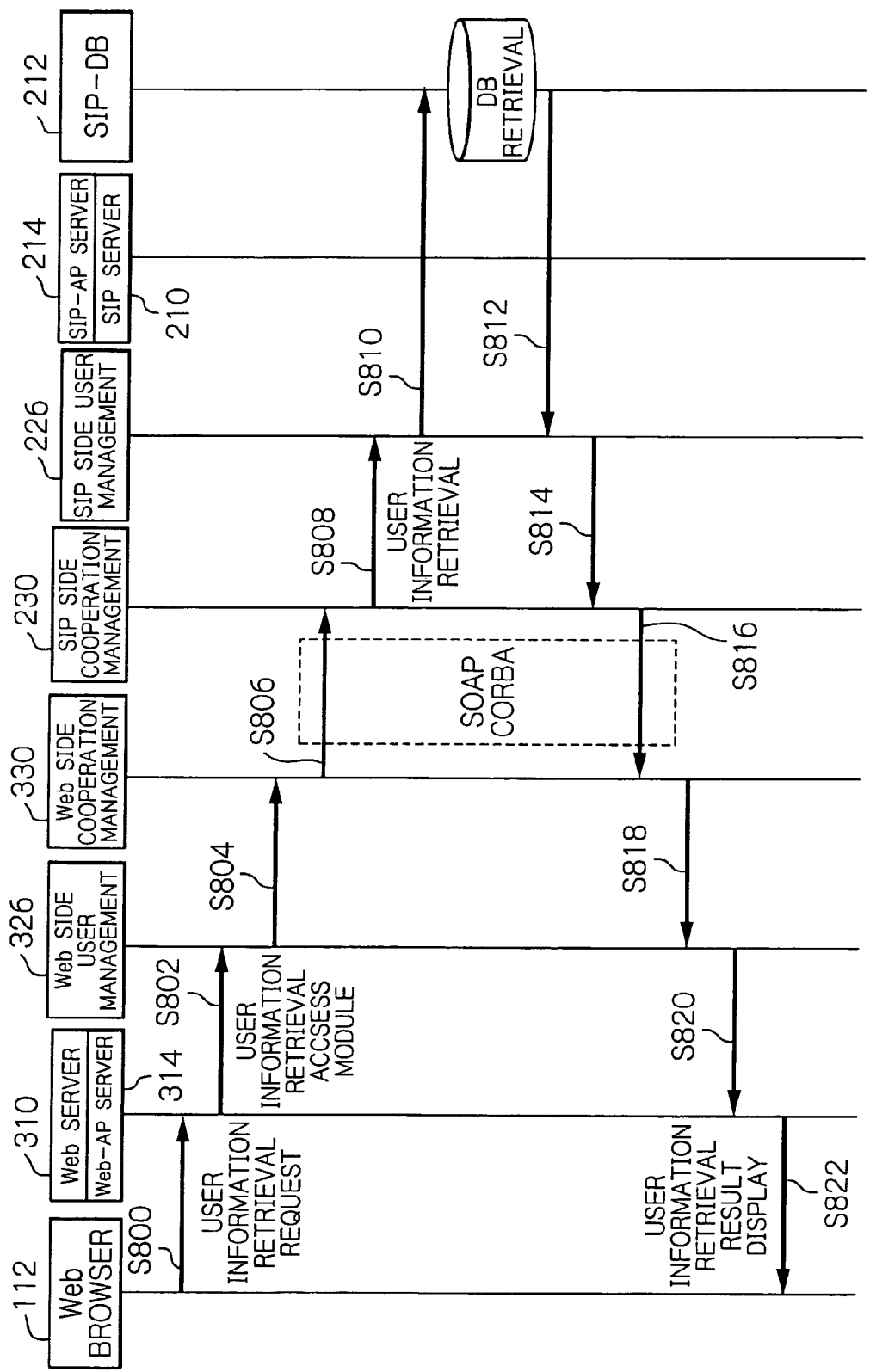
FIG. 8 schematically shows the operating sequence at the time of updating the presence information.

In the above-stated system configuration, the user information retrieving operation, exploiting the signaling management components 228 and 328, out of the operations of the present cooperating system 100, will now be described with reference to the sequence diagram of FIG. 8.

First of all, from the Web browser 112 of the Web client 112, a request for execution of the "user information retrieval request" is issued to the Web server 310 (S800). The user information encompasses the information pertinent to a contract, such as the name, address, age or address information of a user, and the information for carrying out authentication in exploiting the system. This request is made using the GUI (Graphical User Interface) displayed on the Web browser 112 and which is provided by the Web server 310.

Then, based on the "user information retrieval request", as sent to the Web server 310 and to the Web-AP server 314, the user information retrieval access module 434 is booted, using the user management component API 444 in the Web side user management component 326 (S802). The cooperation management component 330 from the Web environment 104 side is then booted from the user information retrieval access module 434 (S804).

The cooperation management component 330 communicates with the cooperation management component 230 on the SIP environment 102 side, present in a different domain on the network, using SOAP or CORBA, for transmitting the information to the user management component 226 on the SIP environment 102 side. The cooperation management component 230 on the SIP environment 102 side communicates with the cooperation management component 330 on the Web environment 104 side to receive the "user information retrieval request" issued by the Web browser 112 (S806).

The user information retrieval module 414 in the user management component 226 on the SIP environment 102 side is booted by the cooperation management component 230 on the side SIP environment 10 (S808). The user information retrieval module 414 retrieves the user information stored in the SIP-DB 212 managed by the SIP-AP server 214 and the SIP server 210 (S810). The user information retrieval module 414 receives the retrieved results of the user information (S812). The user information retrieval module 414 boots the cooperation management component 230 on the SIP environment 102 side (S814).

For sending a reply as to the retrieved results to the user management component 326 on the Web environment 104 side, the cooperation management component 230 communicates with the cooperation management component 330 on the Web environment 104 side, using SOAP or CORBA, to transmit the result of the "user information retrieval request" to the cooperation management component 330 (S816). When the result of the "user information retrieval request" is received by the user information retrieval access module 434 (S818), it is returned to the Web server 310 and to the Web-AP server 314 (S820) as being the result of the execution by the user management component API 444 (data of the user information obtained by the retrieval on the SIP-DB 212). The result of the execution is processed in a form displayable as being the result of retrieval of the user information (e.g. data of HTML or XML). The Web browser 112 receives and displays the result of the execution of the "user information retrieval request" (S822).

Figure 9:
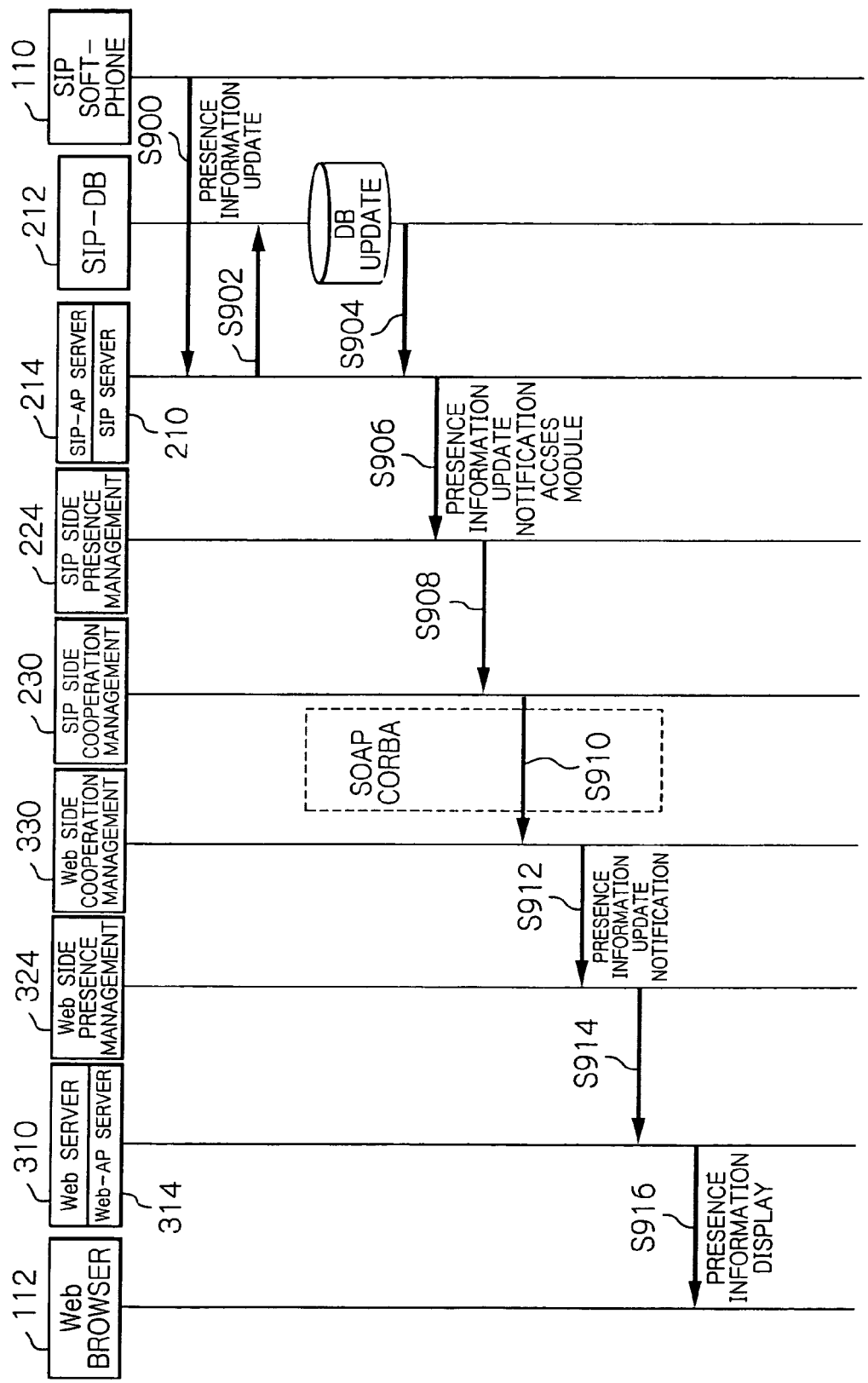
FIG. 9 schematically shows the operating sequence at the time of retrieving the user information.

The presence update notification operation, exploiting the presence management components 224, 324, will now be described with reference to the sequence diagram of FIG. 9.

First, the SIP soft-phone 110 issues a notification request of the "presence information update", representing the client use state, such as the notification of the information 'busy' in case the SIP soft-phone 110 is in use (S900). Usually, this issuing operation is carried out using the GUI (Graphical User Interface) displayed on a dedicated soft-phone system.

The SIP server 210 stores the received "presence information" in the SIP-DB 212 (S902) and receives the result of end of storage and updating of the presence information on the SIP-DB 212 (S904).

Based on the "presence information update request" (request to update the presence information) as sent from the SIP soft-phone 110, the SIP server 210 and the SIP-AP server 214 boot the presence information update notification access module 616, using the presence management component API 618 in the presence management component 224 on the SIP environment 102 side (S906). The presence information update notification access module 616 then boots the cooperation management component 230 on the SIP environment 102 side (S908).

The cooperation management component 230 communicates with the cooperation management component 330 on the Web environment 104 side, present in a different domain on the network, for transmitting the information to the presence management component 324 on the Web environment 104 side, using the SOAP or CORBA. The cooperation management component 230 communicates with the cooperation management component 330 to receive the "presence information update request" issued by the SIP soft-phone 110.

The cooperation management component 330 on the Web environment 104 side boots the presence information update notification module 626 in the presence management component 324 (S912). The presence information update notification module 626 transmits the information as to the updating of the presence information to the Web-AP server 314 and the Web server 310 (S914). The Web-AP server 314 and the Web server 310 process the information into the displayable form information which is sent to the Web browser 112 (S916). The Web browser 112 displays the information "presence information updated" as issued by the SIP soft-phone 110.

Figure 10:
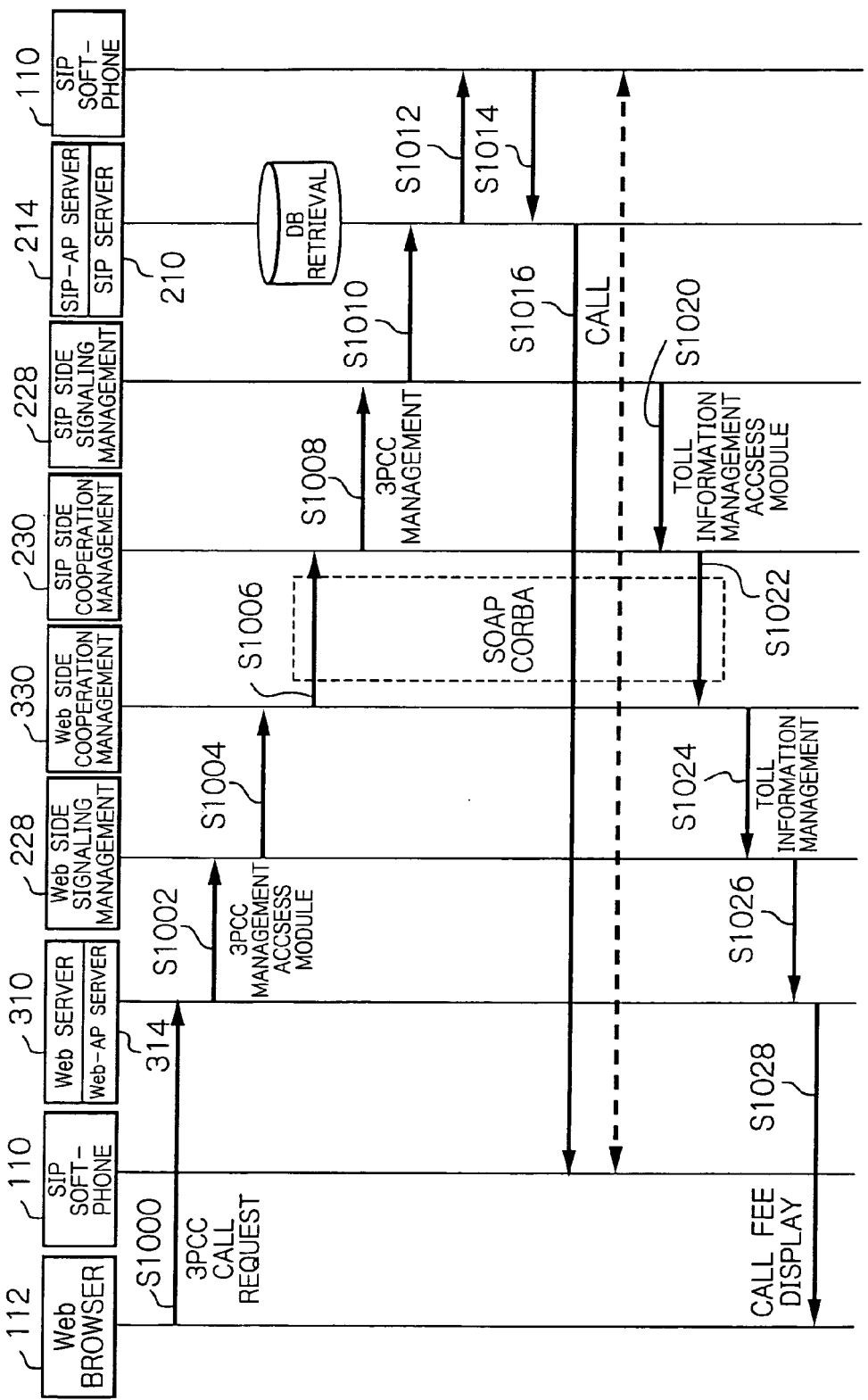
FIG. 10 schematically shows the operating sequence of 3PCC.

The 3PCC operation, exploiting the signaling management components 228 and 328, will now be described with reference to the sequence drawing of FIG. 10.

First, the Web browser 112 issues a "3PCC" call execution request to the Web server 310 (S1000). In general, the GUI, provided by the side Web server, and which is displayed on the Web browser, is used for this purpose. Based on the "3PCC execute request" sent to the Web server 310 and to the Web-AP server 314, the 3PCC management access module 720 is booted, using a signaling management component API 728 in the signaling management component 328 on the Web environment 104 side (S1002).

The 3PCC management access module 720 then boots the cooperation management component 330 on the Web environment 104 side (S1004). The cooperation management component 330 communicates with the cooperation management component 230 on the SIP environment 102 side present in a different domain on the network, using SOAP or CORBA, for transmitting the information to the signaling management component 228 on the SIP environment 102 side (S1006). The cooperation management component 230 on the SIP environment 102 side communicates with the cooperation management component 330 to receive the "3PCC request" issued by the Web browser 112.

The cooperation management component 230 boots the 3PCC management module 710 in the signaling management component 228 on the SIP environment 102 side (S1008).

The 3PCC management module 710 delivers the information concerning two SIP soft-phones 110, to be connected, as the information for executing the 3PCC, to the SIP-AP server 214 and to the SIP server 210 (S1010). The SIP-AP server 214 and the SIP server 210 then issue the connection request with the SIP in the SIP soft-phone 110, as the destination of connection (S1012). The SIP-AP server 214 and the SIP server 210 confirm the connection to one of the SIP soft-phones 110 (S1014).

The SIP-AP server 214 and the SIP server 210 then issue a connection request to the other SIP soft-phone 110 (S1016) This sets the session for call using 3PCC to enable the real-time communication between the two SIP soft-phones 110, and hence the call.

After the completion of the call by 3PCC, the toll information management access module 716 in the signaling management component 228 is booted (S1020). The toll information management access module 716 boots the cooperation management component 230 on the SIP environment 102 side (S1022). The cooperation management component 230 communicates with the cooperation management component 330 on the Web environment 104 side, present in a different domain on the network, using SOAP or CORBA, for transmitting the information to the Web side signaling management component. The cooperation management component 330 communicates with the cooperation management component 230 to receive the "toll information management request" (S1022).

The cooperation management component 330 on the Web environment 104 side boots the toll information management module 726 in the signaling management component 328 (S1024). The toll information management module 726 transmits the toll information (the log information demonstrating e.g. the call time) to the Web-AP server 314 and to the Web server 310 (S1026). The Web-AP server 314 and the Web server 310 process the information into the displayable form information which is sent to the Web browser 112 (S1028).

The tolling may be carried out by introducing the present toll information to a toll system of a service business organization managing the system in question. The Web browser displays the fee for call produced by "3PCC execution".

In the above-described embodiment, the application (AP) constructed on the Web environment 104 and the application (AP) constructed on the SIP environment 102 may cooperate with each other to construct the Web-VoIP convergence type AP which maybe run and managed. The Web-VoIP convergence type may-further be extended by extending the modules on the Web accessor component 222 and those on the SIP accessor component 322 shown in the above embodiment. The Web-VoIP convergence type AP of variable forms may be implemented by increasing the sorts of the SIP-AP and the Web-AP mounted and the sorts of the components.

Figure 11:
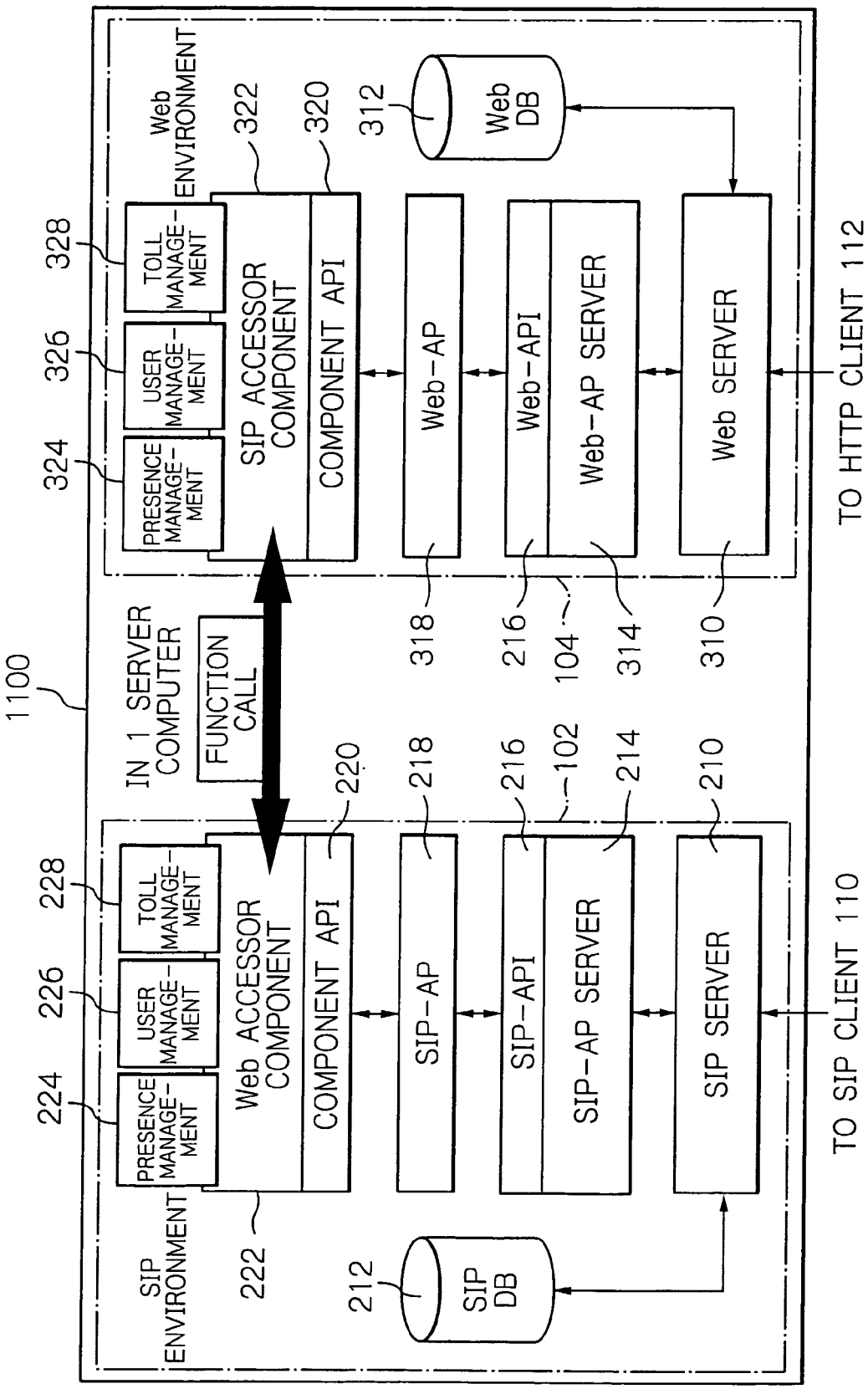
FIG. 11 is a schematic block diagram showing another illustrative structure of a cooperating system embodying the present invention.

FIG. 11 shows another illustrative structure of the service providing system of the present invention. The structure indicated by the same reference numerals as those shown in FIGS. 1, 2 and 3 will not be described for simplicity.

A cooperating system 1100 shown in FIG. 11 is the same as the cooperating system shown in FIG. 1 except for arranging the SIP environment 102 and the Web environment 104 on the same computer environment and interconnecting the environments 102, 104 by process cooperation on the same computer. The common structure is the SIP environment 102 and the Web environment 104 shown in FIGS. 2 and 3 less the network connection function by SOAP and CORBA. The cooperating system 1100 shown in FIG. 11 is not provided with the cooperation management components 230 and 330. The SIP side components and the Web side components interconnect the Web accessor component 222 and the SIP accessor component 322 by a function call (for example, a function call in the C/C++ language or a method call in the Java language)

With the modification, shown in FIG. 11, as with the cooperating system, shown in FIG. 1, the AP constructed on the Web environment 104 and the AP constructed on the SIP environment 102 are able to cooperate with each other to assure facilitated construction, execution and management of the Web-VoIP convergence AP. The present embodiment shows an illustrative structure implemented on a sole computer environment and is featured by realization of convergence of the Web-AP and the VoIP-AP in a small computer environment.

Figure 12:
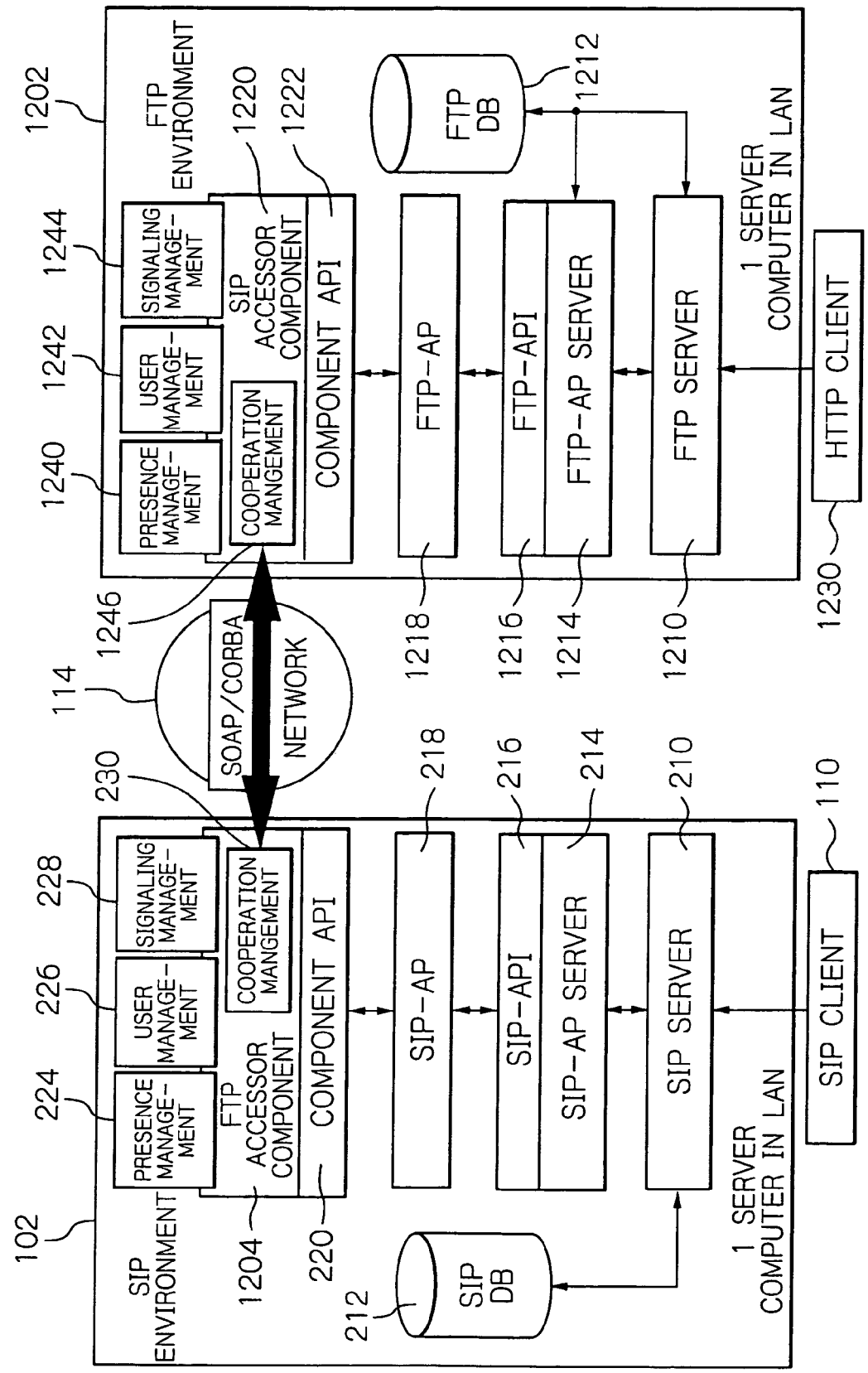
FIG. 12 is a schematic block diagram showing a further illustrative structure of a cooperating system embodying the present invention.

FIG. 12 shows a further illustrative structure of a service providing system embodying the present invention. The structure indicated by the same reference numerals as those shown in FIGS. 1, 2 and 3 will not be described for simplicity.

In a cooperating system 1200 of the present embodiment, the SIP environment 102 and an FTP (File Transfer Protocol) based application (AP) server system, referred to below as an FTP environment 1202, are interconnected by a network 114. The SIP environment 102 and the FTP environment 1202 are arranged in a network environment belonging to different network domains. Moreover, the SIP environment 102 and the FTP environment 1202 are arranged each in one server computer or in a LAN environment in the same domain. Although the structure of the SIP environment 102 maybe similar to the one shown in FIGS. 1 to 7, the components comprising the presence management component 224, the user management component 226, the signaling management component 228 and the cooperation management component 230 are termed FTP accessor components 1204.

The FTP based application (AP) server system (FTP environment) 1202 includes an FTP server 1210, handling and supervising the FTP, a database FTP-DB 1212 for storage of the information supervised by the FTP server 1210, such as the file information transmitted by FTP, an FTP server 1214 for running the application (AP) operating the file transfer protocol managed by the FTP server 1210, an FTP-API 1216 of the AP interface provided by the FTP-AP server 1214, and an FTP-AP 1218 of the application constructed by the FTP-API 1216 and run on the FTP AP server 1214. The FTP-AP 1218 may be exemplified by an application carrying out peer-to-peer file exchange or file-co-owning between two clients. To the FTP server 1210 is connected an FTP client 1230 of the client environment exploiting the function provided by the FTP-AP 1218.

The FTP environment 1202 includes an SIP accessor component 1220 of a set of components (software components) for the FTP-AP 1218 to cooperate with the SIP environment 102, and a component API 1222 of the application interface for the FTP-AP 1218 to exploit the SIP accessor component 1220.

Turning to the components provided in the SIP accessor component 1220, a presence management component 1240 is adapted for accessing the presence information supervised in the SIP environment 102 from the FTP environment 1202. A user management component 1242 is adapted for accessing the user information supervised in the SIP environment 102 from the FTP environment 1202. A signaling management component 1244 is adapted for exploiting the SIP signaling from the FTP environment 1202 by exploiting the SIP server 210 as a component element in the SIP environment 102.

The SIP accessor component 1220 also includes a cooperation management component 1246. The cooperation management component 1246 is a communication environment for cooperating with the cooperation management component 230, arranged in the FTP accessor components 1204 in the SIP environment 102, for accessing the SIP environment 102 using the presence management component 1240, the user management component 1242 and the signaling management component 1244 and for causing the SIP environment 102 side to access the FTP environment 1202. A cooperating management environment is provided by the aforementioned SOAP or CORBA in association with the cooperation management component 230 in the SIP environment 102. The component API 1220 provided in the SIP accessor component 1220 is an application interface (API) for the FTP-AP 1218 to use each component.

The above components 1240, 1242, 1244 and 1246 may be of the same structure as the components 324, 326, 328 and 330 of the management mechanism forming the SIP accessor component 322 of the Web environment 104 shown in FIG. 3.

The presence update notification operation, exploiting the presence management component 1240, will now be described with reference to the sequence chart of FIG. 13. In the present description, the file transmitted is handled as the SIP presence information and the file update information by the file transfer is implemented as the update processing of the SIP presence information.

An FTP client 1300 issues a request for "file transfer" to the FTP server 1210 (S1300). The FTP server 1210 and the FTP-AP server 1214 receive a file from the FTP client 1300, based on the "file transfer request" received, and execute the file transfer. The FTP client then stores the transfer file information in the FTP-DB 1212 (S1302). The FTP server 1210 and the FTP-AP server 1214 then receive the result of the end of storage and updating of the transfer file information on the FTP-DB 1212 (S1304).

Then, based on the "file transfer request" sent from the FTP client 1230, the FTP server 1210 and the FTP-AP server 1214 boot the presence information update notification access module, using the presence management component API 628 in the FTP side presence management component 1240 (S1306). The cooperation management component 1246 is then booted from the presence information update notification access module (S1308). The cooperation management component 1246 communicates with the cooperation management component 230 on the SIP environment 102 side, present in a different domain on the network, using the SOAP or the CORBA, for transmitting the information to the presence management component 224 on the SIP environment 102 side. The cooperation management component 230 communicates with the cooperation management component 1246 to receive the "file transfer request" issued by the FTP client 1230 (S1310)

The cooperation management component 230 on the SIP environment 102 side boots the presence information update notification module in the presence management component 224 on the SIP environment 102 side (S1312). The presence information update notification module transmits the presence information update information to the SIP-AP server 214 and to the SIP server 210 (S1314). The SIP-AP server 214 and the SIP server 210 store and update the transmitted information in the SIP-DB 212 (S1316). The SIP-DB 212 responds to the SIP-AP server 214 and to the SIP server 210 that the presence information has been stored and updated (S1318).

By the above sequence, the file transfer processing, executed from the FTP environment 1202, comes to a close, such that management of the file state as the presence information on the SIP environment 102 side becomes possible.

As described above, the application (AP) constructed on the Web environment 104 and the application (AP) constructed on the SIP environment 102 may cooperate with each other to construct the Web-VoIP convergence type AP which may be run and managed. The Web-VoIP convergence type may further be extended by extending the modules on the FTP accessor component 1204 and those on the SIP accessor component 1220 shown in the above embodiment. The Web-VoIP convergence type AP of variable forms may be implemented by increasing the sorts of the SIP-AP and the Web-AP mounted and the sorts of the components.

In the embodiments shown in FIGS. 2 and 3, explanation has been made of the method and the system for convergence of VoIP-AP (SIP-AP) and Web-AP, while, in the embodiments shown in FIG. 12, explanation has been made of the method and the system for convergence of VoIP-AP (SIP-AP) and FTP-AP. It is thus understood that the system of the present invention may be applied to the convergence of respective different protocols.

The entire disclosure of Japanese patent application No. 2003-296242 filed on Aug. 20, 2003, including the specification, claims, accompanying drawings and abstract of the disclosure is incorporated herein by reference in its entirety.

While the present invention has been described with reference to the particular illustrative embodiments, it is not to be restricted to the embodiments. It is to be appreciated that those skilled in the art can change or modify the embodiments without departing from the scope and spirit of the present invention.

What is claimed is:

1. A service providing system rendering a service for a client device, comprising:

a first communication environment device exploiting an SIP (Session Initiation Protocol), and a second communication environment device exploiting an HTTP (Hyper Text Transfer Protocol) or an FTP (File Transfer Protocol), the first and second communication environment devices executing respective programs to render the service for the client device;

said first communication environment device including a first application provider for providing an application by the SIP to said client device to provide the service for the client device and a first manager for accessing and supervising said second communication environment device;

said second communication environment device including a second application provider for providing an application by the HTTP or FTP to said client device to provide the service for the client device and a second manager for accessing and supervising said first communication environment device; wherein said first manager includes a first presence manager for operating and managing presence information, and a first cooperation manager for cooperating with said second communication environment device;

said second manager includes a second presence manager for accessing said first presence manager, and a second cooperation manager corresponding to the first cooperation manager for cooperating with said first communication environment device;

said first and second managers transmit and receive cooperation information, via the corresponding first and second cooperation managers, for cooperating with each other to render the service to said client device;

said first manager includes a plurality of first library software components, and said second manager includes a plurality of second library software components each corresponding to a different one of the plurality of first library software components;

the first application provider dynamically selects one first library software component from the plurality of first library software components, depending on a cooperation function of the first and second application providers, to cooperate with the second application provider through a corresponding one of the plurality of second library software components via the corresponding first and second cooperation managers; and said first and second cooperation managers are interconnected over a network and transmit and receive the cooperation information in accordance with a predetermined protocol, wherein the applications on said first and second communication environment devices are collaborative with each other to establish Web-VoIP (Voice over Internet Protocol) convergence;

wherein said first manager includes a first user manager for operating and managing user information in the SIP, said second manager including a second user manager for accessing said first user manager;

wherein said second user manager accesses said first user manager using a stub conforming with a remote access;

wherein said first manager includes a first signaling manager for operating and managing signaling information in the SIP, said second manager including a second signaling manager for accessing said first signaling manager;

wherein said first communication environment device and said second communication environment device are provided in a same server; and wherein said first manager transmits and receives the cooperation information using a function call.

2. The system according to claim 1, wherein the predetermined protocol is SOAP (Simple Object Access Protocol).

3. The system according to claim 1, wherein the predetermined protocol is a protocol by CORBA (Common Object Request Broker Architecture).

4. A method of providing a service for a client device by a first communication environment device exploiting an SIP (Session Initiation Protocol) and a second communication environment device exploiting an HTTP (Hyper Text Transfer Protocol) or an FTP (File Transfer Protocol), said method comprising:

a first service providing step of providing an application service from the first communication environment device to the client device, using the SIP, to provide the service for the client device;

a first management step of accessing to the second communication environment device from the first communication environment device for managing the second communication environment device;

a second service providing step of providing an application service from the second communication environment device to the client device, using the HTTP or FTP, to provide the service to the client device;

a second management step of accessing the first communication environment device from the second communication environment device for managing the first communication environment device; and a cooperation information transmitting step of transmitting cooperation information for the first and second communication environment devices to cooperate with each other, from the first communication environment device to the second communication environment device, wherein said first management step includes a first presence management step of operating and managing presence information, and a first cooperation management step of cooperating with said second communication environment device;

said second management step including a second presence management step of accessing the presence information, and a second cooperation management step, in response to the first cooperation management step, of cooperating with said first communication environment device;

said first management step provides a plurality of first library software components, and said second management step provides a plurality of second library software components each corresponding to one of the plurality of first library software components;

said cooperation information transmitting step dynamically selects one first library software component, from the plurality of first library software components, depending on a cooperation function between the first and second communication environment devices, to cooperate with the second communication environment device through a corresponding one of the plurality of second library software components via the corresponding first and second cooperation management steps; and said cooperation information transmitting step transmits a response to the cooperation information, transmitted to the second communication environment device, from the second communication environment device to the first communication environment device, wherein the application services on the first and second communication environment devices are collaborative with each other to establish Web-VoIP (Voice over Internet Protocol) convergence;

wherein said first management step includes a first user management step of operating and managing user information in the SIP, said second management step including a second user management step of accessing the user information;

wherein said second user management step accesses the user information using a stub conforming with remote access;

wherein said first management step includes a first signaling management step of operating and managing signaling information in the SIP, said second management step including a second signaling management step of accessing the signaling information; and wherein, when the first communication environment device and the second communication environment device are provided in a same server, said first manager transmitting and receiving the cooperation information using a function call.

5. The method according to claim 4, wherein said cooperation information transmitting step transmits the cooperation information between the first communication environment device and the second communication environment device using SOAP (Simple Object Access Protocol).

6. The method according to claim 4, wherein said cooperation information transmitting step transmits the cooperation information between the first communication environment device and the second communication environment device using CORBA (Common Object Request Broker Architecture).

7. A service providing program recorded on non-transitory computer-readable media to control a computer, wherein a first communication environment device exploiting an SIP (Session Initiation Protocol) and a second communication environment device exploiting an HTTP (Hyper Text Transfer Protocol) or an FTP (File Transfer Protocol) render a service for a client device, said program comprising:

a first service providing step of providing an application service from the first communication environment device to the client device, using the SIP, to provide the service for the client device;

a first management step of accessing the second communication environment device from the first communication environment device for managing the second communication environment device;

a second service providing step of providing an application service from the second communication environment device to the client device, using the HTTP or FTP, to provide the service for the client device;

a second management step of accessing the first communication environment device from the second communication environment device for managing the first communication environment device; and a cooperation information transmitting step of transmitting the cooperation information for the first and second communication environment devices to cooperate with each other from the first communication environment device to the second communication environment device, wherein said first management step includes a first presence management step of operating and managing presence information, and a first cooperation management step of cooperating with said second communication environment device;

said second management step includes a second presence management step of accessing the presence information, and a second cooperation management step, in response to the first cooperation management step, of cooperating with said first communication environment device;

said first management step provides a plurality of first library software components, and said second management step provides a plurality of second library software components each corresponding to one of the plurality of first library software components;

said cooperation information transmitting step dynamically selects one first library software component, from the plurality of first library software components, depending on a cooperation function between the first and second communication environment devices, to cooperate with the second communication environment device through a corresponding one of the plurality of second library software components via the corresponding first and second cooperation management steps; and said cooperation information transmitting step transmits a response to the cooperation information, transmitted to the second communication environment device, from the second communication environment device to the first communication environment device, wherein the application services on the first and second communication environment devices are collaborative with each other to establish Web-VoIP (Voice over Internet Protocol) convergence;

wherein said first management step includes a first user management step of operating and managing user information in the SIP, said second management step including a second user management step of accessing the user information;

wherein said second user management step accesses the user information using a stub conforming with remote access;

wherein said first management step includes a first signaling management step of operating and managing signaling information in the SIP, said second management step including a second signaling management step of accessing the signaling information; and wherein, when the first communication environment device and the second communication environment device are provided in a same server, said first management step transmitting and receiving the cooperation information using a function call.

8. The media according to claim 7, wherein said cooperation information transmitting step transmits the cooperation information between the first communication environment device and the second communication environment device using SOAP (Simple Object Access Protocol).

9. The media according to claim 7, wherein said cooperation information transmitting step transmits the cooperation information between the first communication environment device and the second communication environment device using CORBA (Common Object Request Broker Architecture).

10. The service providing system of claim 1, wherein the plurality of first library software components and the plurality of second library software components respectively include at least one of a presence management component, a user management component and a signaling management component.

11. The method of claim 4, wherein the plurality of first library software components and the plurality of second library software components respectively include at least one of a presence management component, a user management component and a signaling management component.

12. The media of claim 7, wherein the plurality of first library software components and the plurality of second library software components respectively include at least one of a presence management component, a user management component and a signaling management component.

* * * * *